No. 713,375. Patented Nov. 11, 1902.
H. C. BAASE.
TRANSMISSION MECHANISM.
(Application filed Jan. 28, 1902.)
(No Model.)
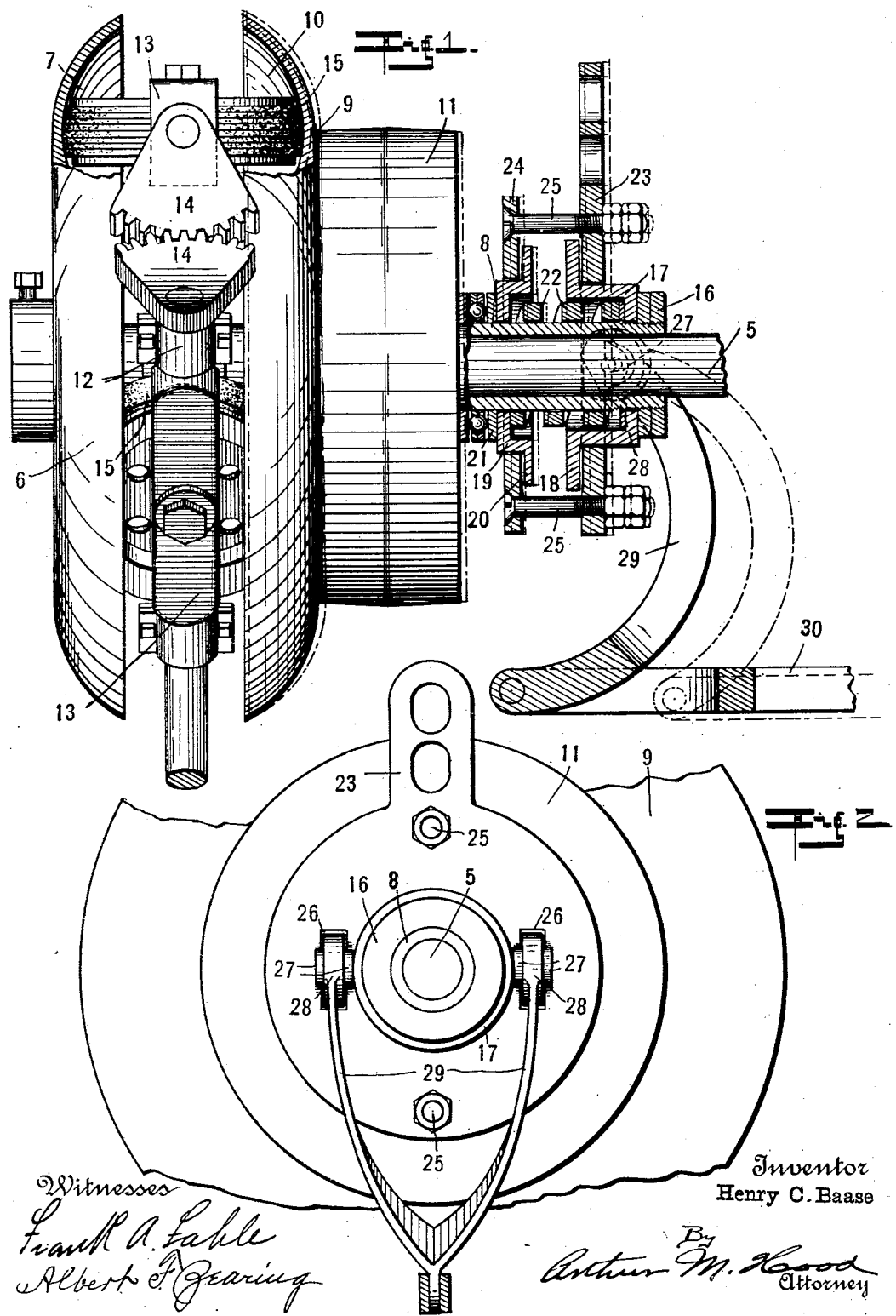
Witnesses
Frank A. Fahle
Albert F. Gearing
Inventor
Henry C. Baase
By Arthur M. Hood
Attorney

United States Patent Office.

HENRY C. BAASE, OF INDIANAPOLIS, INDIANA, ASSIGNOR TO SPEED CHANGING PULLEY COMPANY, OF INDIANAPOLIS, INDIANA, A CORPORATION OF INDIANA.

TRANSMISSION MECHANISM.

SPECIFICATION forming part of Letters Patent No. 713,375, dated November 11, 1902.

Application filed January 28, 1902. Serial No. 91,603. (No model.)

*To all whom it may concern:*

Be it known that I, HENRY C. BAASE, a citizen of the United States, residing at Indianapolis, in the county of Marion and State of Indiana, have invented a new and useful Transmission Mechanism, of which the following is a specification.

My invention relates to an improvement in self-contained speed-changing pulleys, such as that shown in Patent No. 681,144. In a pulley of this class the driving and driven elements are held in engagement with intermediate transmission-wheels by a spring; and the object of my present invention is to provide means for withdrawing the spring-pressure, so that the driving elements may act as a loose pulley.

The accompanying drawings illustrate my invention.

Figure 1 is a side elevation, partially in section. Fig. 2 is an end elevation.

In the drawings, 5 indicates a shaft, to which the pulley is attached. The driven element consists of a disk 6, having an annular track 7, semicircular in cross-section, and carried by the disk is an axial sleeve 8, which is sleeved upon shaft 5 and secured thereto by a suitable set-screw.

Revolubly mounted upon sleeve 8 is a driving-disk 9, provided with a track 10, similar to track 7. Formed integral with or carried by disk 9 is a pulley 11. Sleeved upon sleeve 8 is a spider 12, which carries a plurality of yokes 13, which are geared together by segments 14. The axis of each yoke 13 lies at right angles to the axis of sleeve 8, and each of said yokes carries a friction-pulley 15, the axis of which is at right angles to the axis of the yoke and also at right angles to the sleeve 8, as is clearly described in the patent above mentioned. Pulleys 15 lie in tracks 7 and 10 and form a driving connection therebetween.

Threaded on the end of the sleeve 8, so as to be longitudinally adjustable thereon, is a collar 16. Rotatable upon sleeve 8 and in engagement with collar 16 is a collar 17, provided with a peripheral flange 18. Also rotatable upon sleeve 8 is a collar 19, provided with a peripheral flange 20. Arranged between the collar 19 and the hub of disk 9 is a thrust-bearing 21. Surrounding sleeve 8 and lying between collars 17 and 19 is a compression-spring 22, which spring holds collar 17 into engagement with collar 16 and urges collar 19 along sleeve 8, so as to exert a pressure through thrust-bearing 21 upon disk 9. Sleeved around collar 17 and engaging flange 18 thereof is a bracket 23, which is adapted to be bolted or connected to a stationary support in such manner as to prevent its turning about the shaft 5. Sleeved upon collar 19 and engaging flange 20 thereof upon the side opposite from the side of engagement of bracket 23 with flange 18 is a ring 24, which is connected to bracket 23 by bolts 25. Formed through bracket 23 upon opposite sides of the center are openings 26, adjacent each of which is a pair of ears 27. Pivoted between each pair of ears 27 and extending through the slots 26 in bracket 23 is a cam 28, which is adapted to engage flange 18 of collar 17. The two cams 28 are preferably connected by a yoke 29, to the lower end of which is pivoted a shifting-lever 30.

In operation yoke 29 lies normally in the position shown in full lines in Fig. 1, this position of the yoke bringing the shortest diameter of the cams 28 opposite flange 18, so that spring 22 may exert its pressure against collars 16 and 19, and thus draw the driving and driven disks together and into engagement with the intermediate wheels 15, flanges 18 and 20 being out of engagement with bracket 23 and ring 24, so that collars 17 and 19 may rotate with sleeve 8. By throwing yoke 29 into the position shown in dotted lines in Fig. 1 the longer diameter of the cams is brought into engagement with flange 18, the collar 17 thus resulting in a shifting of bracket 23 axially upon collar 17. This shifting of bracket 23 causes a similar movement of ring 24 into engagement with flange 20, so that collar 19 is shifted upon sleeve 8 to the position shown in dotted lines in Fig. 1. Spring 22 is thus put under pressure between the two collars 17 and 19, and the pressure of the spring is consequently withdrawn from both of the disks. The spring is, in fact, supported at both ends by bracket 23, and bracket 23, ring 24, collars 17 and 19, and spring 22 become practically an entity, which does not affect the other elements, so that sleeve 8 is free to rotate within collars 17 and 19, and spring 22 and disk 9 may rotate freely upon sleeve 8 without rotating wheels 15, or sleeve 8 of disk 7 may rotate within disk 9 and pulley 11. It is to be understood that either disk 7 or 9 may become the driving element, as the driving force may be applied either to pulley 11 or to shaft 5 and sleeve 8.

I claim as my invention—

1. In a speed-changing mechanism, the combination with the driving and driven elements and an intermediate transmission element therebetween, of a spring normally tending to force the driving and driven elements into engagement with the intermediate transmission element, an external support, and means for transferring the spring-pressure from said elements to the external support, whereby the driving element may run without transmitting motion to the other element.

2. In a self-contained speed-changing pulley, the combination with a driven disk and driving-disk, one revolubly mounted upon the other, an intermediate transmission-wheel arranged between the two elements and movable relatively thereto, of a spring engaging the driving and driven elements and normally urging said elements toward each other and into engagement with the intermediate transmission-wheel, an external support, and means for temporarily transferring the spring-pressure from one of the elements to the external support.

3. In a self-contained speed-changing pulley, the combination of a disk having an axial sleeve, a second disk rotatably mounted upon said sleeve, an intermediate transmission-wheel arranged between the two disks, a spring arranged upon said sleeve and engaging the sleeve and second disk at its opposite ends so as to move said disks toward each other, a cam-support, means carried by the said support for engaging one end of the spring, a cam carried by the cam-support, means engaged by the cam for engaging the opposite end of the spring, and means for shifting the cam whereby a compression of the spring by the movement of the cam will transfer the pressure of the spring from the two disks to the cam-support.

4. In a self-contained speed-changing pulley, the combination of a disk having an axial sleeve, a second disk rotatably mounted on said sleeve, an intermediate transmission-wheel arranged between the two disks, a collar longitudinally movable and rotatable upon the sleeve, a second collar also rotatable upon the sleeve, means carried by the sleeve for holding the second collar in one direction on the sleeve, a bracket surrounding said second collar and adapted to be connected to a support outside the pulley, a cam carried by said bracket and adapted to engage the second collar, a spring arranged between the two collars, and a connection between the first collar and the bracket, substantially as and for the purpose set forth.

5. The combination with a pair of relatively rotatable coöperating elements one rotatably mounted upon and axially movable toward the other, of a spring adapted to engage at its opposite ends with said elements so as to normally urge said last-mentioned element axially, an external support, and means carried by said external support for engaging the spring and compressing the same so as to transfer the pressure of said spring from the coöperating elements to the external support.

6. The combination with a rotatable element having an axial sleeve adapted to receive a shaft, of a second coöperating element rotatably mounted and axially movable upon the sleeve, a pair of collars rotatably mounted upon the sleeve one of said collars being arranged to engage the sleeve axially in one direction and the other of said collars arranged to engage the coöperating element axially in the opposite direction, a compression-spring mounted between said collars, an external support, and means carried by said support for engaging both of the collars and shifting them relatively whereby the pressure of the spring may be transferred from the rotatable elements to the external support.

7. The combination with a pair of coöperating elements one axially movable toward the other, of a spring adapted to engage both of said elements and normally urge the axially-movable element in one direction, an external support, and means carried by said external support for engaging opposite ends of the spring and operating thereon to transfer the action thereof from the coöperating elements to the external support.

HENRY C. BAASE.

Witnesses:
ARTHUR M. HOOD,
FRANK A. FAHLE.